United States Patent [19]

Kanazawa et al.

[11] Patent Number: 4,932,215
[45] Date of Patent: Jun. 12, 1990

[54] CONTROL APPARATUS FOR MULTI-AIR-CONDITIONER SYSTEM

[75] Inventors: Hidetoshi Kanazawa, Fujinomiya; Yoshinori Murashige, Fuji, both of Japan

[73] Assignee: Kabushiki Kaisha Toshiba, Kawasaki, Japan

[21] Appl. No.: 359,409

[22] Filed: May 31, 1989

[30] Foreign Application Priority Data

Jun. 30, 1988 [JP] Japan ................................ 63-163358

[51] Int. Cl.⁵ .............................................. F25B 43/02
[52] U.S. Cl. .......................................... 62/84; 62/192; 62/231
[58] Field of Search ............................ 62/84, 192, 231

[56] References Cited

U.S. PATENT DOCUMENTS 4,697,431 10/1987 Alsenz ............................. 62/192 X

FOREIGN PATENT DOCUMENTS 0083833 4/1986 Japan ...................................... 62/84
62-125265 6/1987 Japan .

Primary Examiner—William E. Wayner
Attorney, Agent, or Firm—Foley & Lardner, Schwartz, Jeffery, Schwaab, Mack, Blumenthal & Evans

[57] ABSTRACT

A control apparatus for a multi-air-conditioner system provided with a freezing cycle wherein refrigerant is supplied from a common outdoor unit to a plurality of indoor units via respective control valves. In order for a compressor to recover refrigerant and oil contained therein remaining in an indoor unit under interception, the control valve of the indoor unit under interception is opened cyclically to a degree of opening corresponding to the rated capacity of the indoor unit for the predetermined time while circulating the refrigerant cyclically for a predetermined time to the indoor unit.

5 Claims, 5 Drawing Sheets

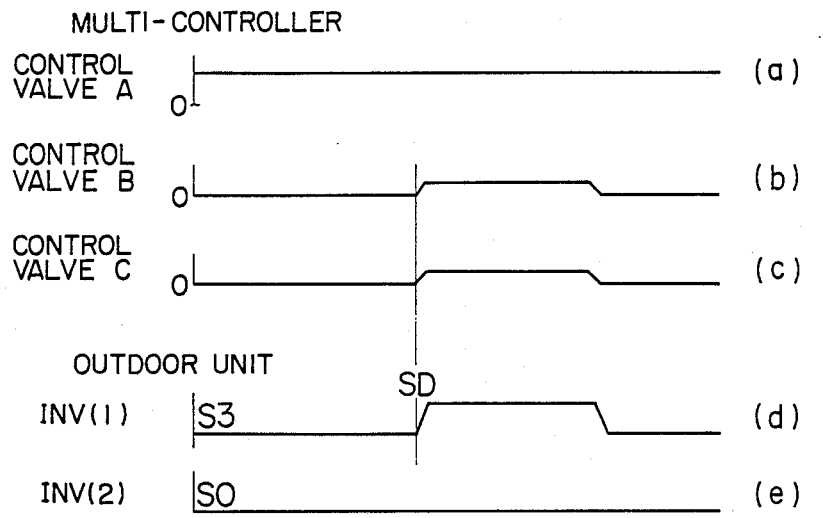
TIMING CHART FOR COMPRESSOR OPERATING FREQUENCY & OPENING DEGREE OF CONTROL VALVE
F I G. 4
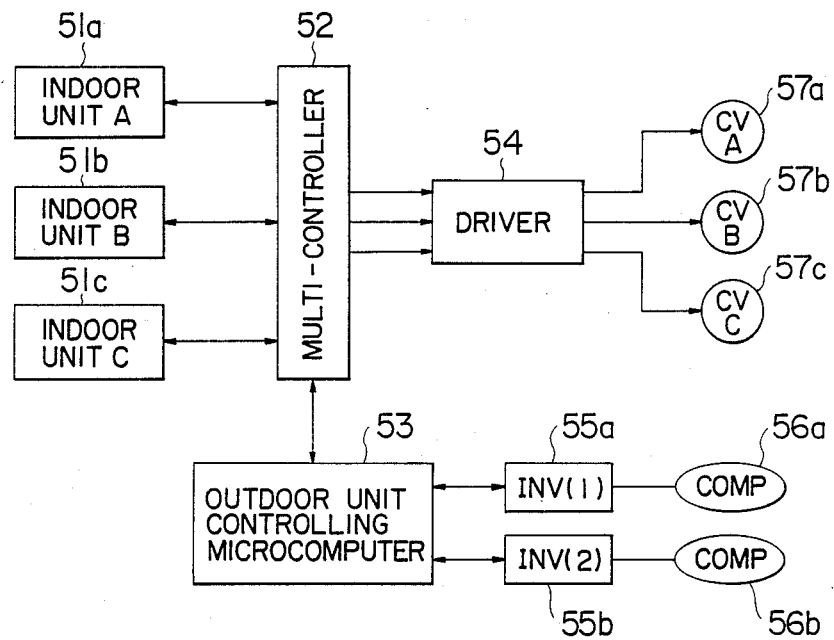
F I G. 5

CONTROL APPARATUS FOR MULTI-AIR-CONDITIONER SYSTEM

BACKGROUND OF THE INVENTION

1. Field of the Invention

The present invention relates to a control apparatus for a multi-air-conditioner system for controlling the operation of a multi-air-conditioner system.

2. Description of the Background Art

An example of the structure of a general cooling cycle in a multi-air-conditioner system is shown in FIG. 7. The multi-air-conditioner system shown in FIG. 7 can selectively perform either a cooling operation or a heating operation upon switching of a four-way valve 74.

In the cooling operation, refrigerant is supplied to a plurality of multi-controllers 70a and 70b via a passage from compressors 76a and 76b, to oil separators 81a and 81b, check valves 82a and 82b, a four-way valve 74, an outdoor heat exchanger 77, a check valve 83, a liquid tank 84, and to a header 85a. The refrigerant supplied to the multi-controller 70a for example is distributed to three indoor units 71a to 71c via control valves 73a to 73c and expansion valves 72a to 72c. Each indoor unit is constructed substantially of an indoor heat exchanger. The refrigerant performs heat-exchange with the room air while passing through the indoor units 71a to 71c, and is collected again at a second header 85b. The refrigerant supplied from the header 85a to the second multi-controller 70b and passed through indoor units 71d to 71f is also collected at the second header 85b. The refrigerant at the second header 85b returns via the four-way valve 74 and an accumulator 75 to the suction side of the compressors 76a and 76b.

In a heating operation which is conducted upon switching the four-way valve 74, the refrigerant supplied from the compressors 76a and 76b and passed through the four-way valve 74 is first introduced to the header 85b. and diverted into the multi-controllers 70a and 70b. The refrigerant then passes through the indoor units 71a to 71c and 71d to 71f, again passes through the multi-controllers 70a and 70b, and is collected at the header 85a. Specifically, within the multi-controller 70a, the refrigerant passed through the indoor heat exchangers 71a to 71c flows toward the header 85a via the check valves 88a to 88c and control valves 73a to 73c. The refrigerant from the header 85a is re-circulated to the compressors 76a and 76b via the liquid tank 84, expansion valve 78, indoor heat exchanger 77, four-way valve 74 and accumulator 75.

If an operation command is given to the indoor unit group 71, e.g., the indoor unit 71a shown in FIG. 7, the control valve 73a is opened and the other control valves 73b and 73c are maintained closed.

An apparatus for controlling the above-described cooling cycle is shown in FIG. 6. As shown in FIG. 6, each indoor unit 71a to 71c has its own terminal console 61a to 61c. A command from the terminal consoles 61a to 61c is sent via indoor microcomputers 62a to 62c to a multi-controller 63a. Upon input of an operation command from the terminal console 61a for example, the multi-controller 63a outputs an open command to the control valve 73a belonging to the indoor unit 71a. In addition, the multi-controller 63a causes inverters 65a and 65b, via an interface unit (I/F unit) 64, 65b to be driven. The inverters 65a and 65b supply power to AC motors (not shown) which drive the compressors 76a and 76b.

A command from terminal consoles 61d to 61f is sent to the I/F unit 64 via indoor microcomputers 62d to 62f and multi-controller 63b.

With a conventional control apparatus for a multi-air-conditioner system, if the indoor unit group 71 is partially operated, e.g., only the indoor unit 71a is operated, the corresponding control valve 73a is opened and the other control valves 73b and 73c are closed for the indoor units 71b and 71c now at a stop. Such an open/close state of the control valves also occurs during a so-called "thermo-off". Namely, a thermostat is actuated when the room temperature becomes equal to or lower than a preset temperature during a cooling operation, or when the room temperature becomes equal to or higher than a preset temperature during heating operation. Upon actuation of the thermostat, the corresponding control valve is closed. In such a case, refrigerant containing lubricating oil which has leaked from the compressor and has not been recovered by the oil separators 81a and 81b remains in the indoor unit whose operation is being intercepted. If the refrigerant containing lubricating oil remains in the indoor unit for which operation is being intercepted, the amount of lubricating oil in the compressors 76a and 76b is gradually reduced and also the amount of refrigerant recirculating to the compressors 76a and 76b is reduced. Reduction o lubricating oil results in lowering the level of oil in the compressor, and may cause abnormal lubrication. Furthermore, deficiency of refrigerant results in a pressure rise of the compressor. Therefore, it has been necessary in such a case to forcibly lower the capability of the cooling cycle by stopping a room fan or by reducing the speed of the compressor.

SUMMARY OF THE INVENTION

It is therefore an object of the present invention to provide a control apparatus for a multi-air-conditioner system that can efficiently recover by a compressor without much deteriorating the cooling or heating operation, refrigerant and compressor lubricating oil mixed in with the refrigerant and which have remained in an indoor unit for which operation has been intercepted or stopped during the operation of the multi-air-conditioner system.

The above object can be achieved by providing a control apparatus for a multi-air-conditioner system of this invention having a plurality of indoor units each having an indoor heat exchanger, an outdoor unit having a compressor and an outdoor heat exchanger, and a plurality of control valves each provided for each of said plurality of indoor units for controlling the flow of refrigerant circulating through said compressor and said plurality of indoor units, said control apparatus comprising first timer means for setting a time corresponding to the period of a recovery control operation for recovering refrigerant and/or oil contained therein and which remains in an indoor unit for which operation is being intercepted; second timer means for setting a continuation time of said recovery control operation; valve opening degree calculation means for calculating the degree of opening of a control valve for an indoor unit which is to be operated during said recovery control operation, in accordance with the rated capacity of said indoor unit; and means for causing said control valve of said indoor unit for which operation is being intercepted, to open to the degree of opening calculated

BRIEF DESCRIPTION OF THE DRAWINGS

FIG. 4 is a timing chart illustrating the degree of opening of control valves and the compressor operation frequency while a multi-controller controls the refrigerant/oil recovery during cooling operation of a multi-air-conditioner system;

FIG. 5 is a block diagram showing an embodiment of a control apparatus for a multi-air-conditioner system according to the present invention;

DETAILED DESCRIPTION OF THE EMBODIMENTS

Figure 1:
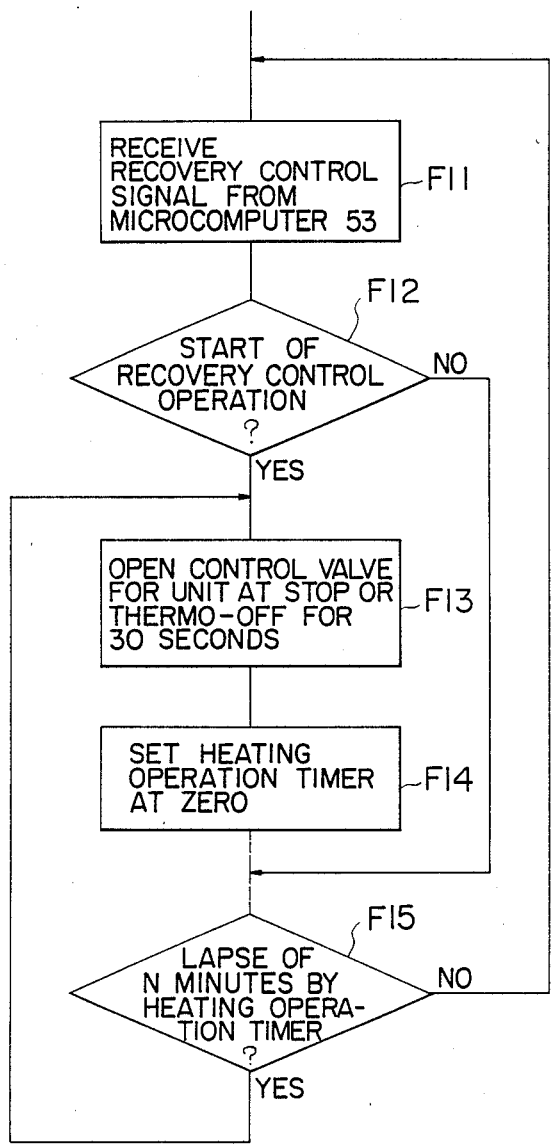
FIG. 1 is a flow chart illustrating the operation of controlling refrigerant/oil recovery by a multi-controller during heating operation of a multi-air-conditioner system.

An embodiment of the control apparatus for a multi-air-conditioner system of this invention will be described with reference to the accompanying drawings.

FIG. 5 shows three indoor units 51a to 51c and two compressors 56a and 56b. The compressors 56a and 56b are driven by motors (not shown) via inverters 55a and 55b. Control valves 57a to 57c are provided for controlling the amount of refrigerant to be circulated through the indoor units 51a to 51c. The control valves 57a to 57c are controlled by a multi-controller 52 via a driver 54. The indoor units 51a to 51c are controlled by the multi-controller 52, and the inverters 55a and 55b are controlled by an outdoor unit controlling microcomputer 53 which is controlled by the multi-controller 52.

Next, controlling refrigerant/oil recovery will be described separately for the heating operation mode and for the cooling operation mode.

(1) Controlling refrigerant/oil recovery during the heating operation mode (refer to FIG. 1)

If a signal representative of a start of recovery control operation is sent from the outdoor unit controlling microcomputer 53 after the multi-air-conditioner system starts the heating operation (refer F12 in FIG. 1), then the multi-controller 52 controls the driver 54 such that the degree of opening of a control valve corresponding to an indoor unit now being intercepted becomes $Q_n$ which is determined by the following equation (1) (refer to F13 in FIG. 1);

$$Q_n = K_1 \times H_s + a_1 \quad (1)$$

where $K_1$ and $a_1$ are constants specific to the multi-air-conditioner system, and $H_s$ is a rated capacity of the indoor unit now being intercepted.

The control valve is maintained to have the degree of opening $Q_n$ for only 30 seconds (refer to F13 in FIG. 1). After the lapse of 30 seconds, it is closed. It is desirable that this duration of 30 seconds be made longer from the standpoint of refrigerant/oil recovery. However, if it is set too long, the room is heated excessively Therefore, the time duration is limited to 30 seconds or less.

The above recovery control is executed at the time interval of N minutes (e.g., 5 minutes or 10 minutes) after the start of the heating operation. Every time recovery control is executed, the control valve of an indoor unit being intercepted, is maintained at the opening degree $Q_n$ for 30 seconds, and after the lapse of 30 seconds the control valve is closed. Such refrigerant/oil recovery control is repeated (refer to F14 and F15 in FIG. 1). If there is neither an indoor unit whose operation has been intercepted nor a thermo-off indoor unit at the time of count-up of a N minute timer, then the recovery control is not executed but a timer for the heating operation time is reset. The cases where the heating operation timer is cleared may include (a) when a defrosting operation starts, (b) when a signal from the indoor unit indicates cooling operation, (c) the multi-air-conditioner system stops operation, or the like. If a heating operation command is sent, during recovery control, from the indoor unit now being intercepted, the recovery control for the indoor unit is terminated and ordinary heating operation is carried out instead. Furthermore, if another indoor unit stops during recovery control, recovery control for the other indoor unit is also executed.

Figure 2:
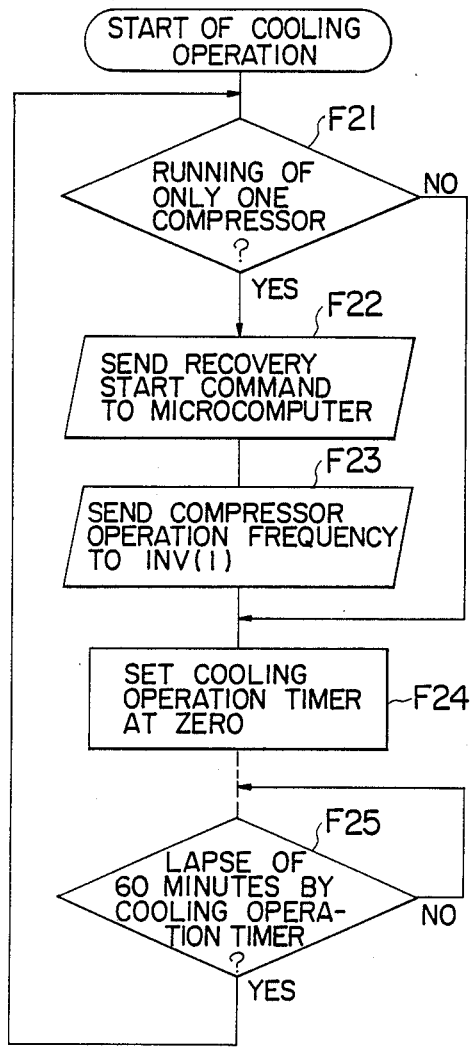
FIG. 2 is a flow chart illustrating the operation of controlling refrigerant/oil recovery by an outdoor unit controlling microcomputer during cooling operation of a multi-air-conditioner.
Figure 3:
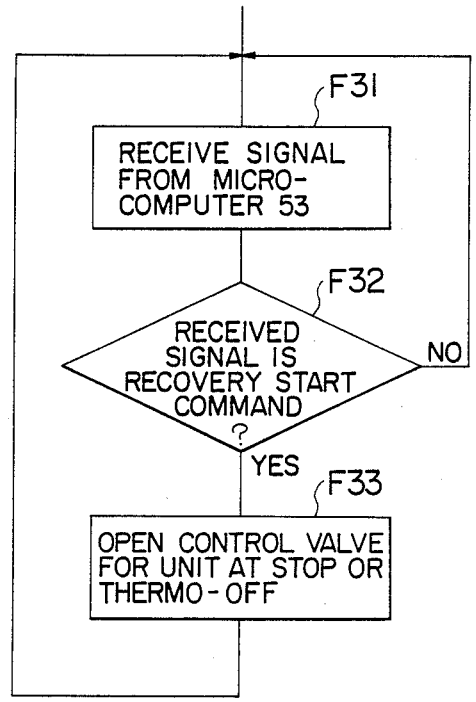
FIG. 3 is a flow chart illustrating the operation of controlling refrigerant/oil recovery by a multi-controller during cooling operation of a multi-air-conditioner system.
Figure 6:
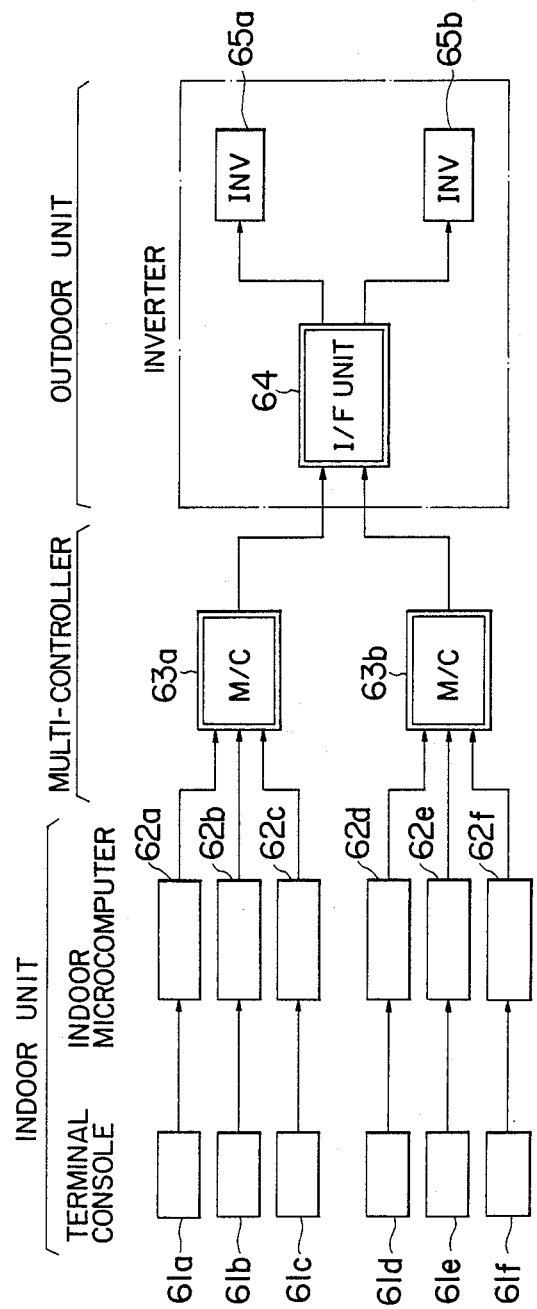
FIG. 6 is a block diagram showing an embodiment of a conventional control apparatus for a multi-air-conditioner system.
Figure 7:
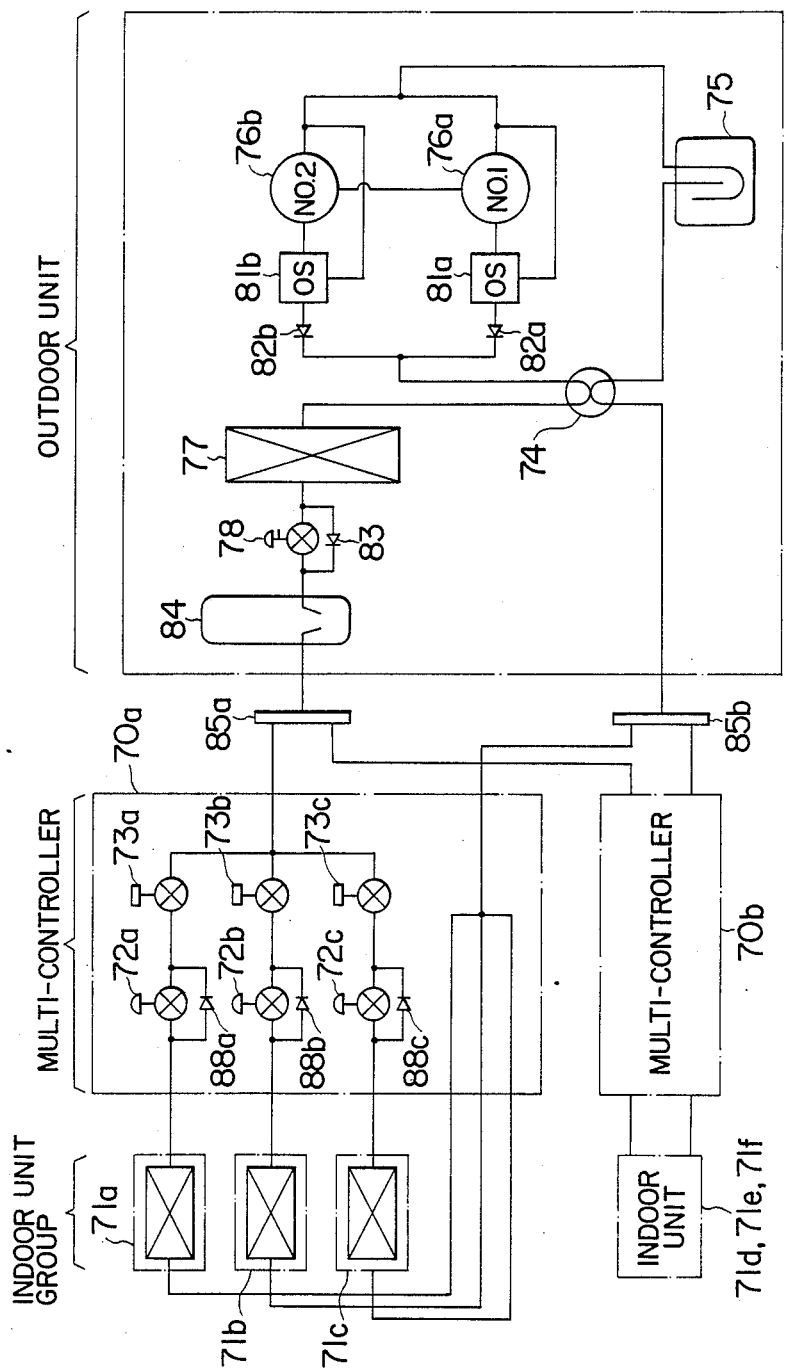
FIG. 7 is a block diagram showing a freezing cycle of a multi-air-conditioner system.

(1) Controlling refrigerant/oil recovery during the cooling operation mode (refer to FIGS. 2 and 3)

After the start of the cooling operation by the multi-air-conditioner system, it is checked by the outdoor controlling microcomputer 53 if only one of the compressors is operated or not (refer to F21 in FIG. 2). If only one compressor is operated, the outdoor unit controlling microcomputer 53 sends a recovery control start command to the multi-controller 52 (refer F22 in FIG. 2). Then the multi-controller 52 controls the driver 54 such that the degree of opening of a control valve corresponding to an indoor unit now being intercepted becomes $Q_n$ which is determined by the following equation (2) (refer to F33 in FIG. 3);

$$Q_n = K_2 \times H_s + a_2 \quad (2)$$

where $K_2$ and $a_2$ are a constant specific to the multi-air-conditioner system, and $H_s$ is a rated capacity of the indoor unit now being intercepted.

The control valve is maintained to have a degree of opening $Q_n$ for one minute. After the lapse of one minute, it is closed.

After sending the recovery control start command to the multi-controller 52, the outdoor controlling microcomputer 53 sends a compressor operation frequency SD to, e.g., the inverter 55a corresponding to the compressor 56a under operation (refer to F23 in FIG. 2). The compressor 56a then operates at a frequency of operation of SD higher than S3 as shown in FIG. 4.

FIG. 4 is a timing chart for the recovery control operation where only the indoor unit 51a is operated and the indoor units 51b and 51c are being intercepted. The inverter 55a (INV 1) changes the operation frequency of the compressor 56a from S3 to SD, and the control valves 57b and 57c (CV B and CV C) are maintained at the predetermined degree of opening to conduct recovery control.

The refrigerant/oil recovery control described above is carried out at the interval of 60 minutes as shown in FIG. 2 (refer to F24 and F25 in FIG. 2).

The recovery control detailed in the foregoing description has the following advantages.

(a) It is possible to efficiently recover refrigerant/oil remaining in an indoor unit being intercepted, to the compressor. Therefore, adverse effects imposed upon the freezing cycle can be avoided.

(b) It is possible to more reliably recover refrigerant/oil remaining in an indoor unit by raising the frequency of operation of the compressor of the outdoor unit during the recovery control operation.

(c) Since the degree of opening of the control valve which is opened during the recovery control operation, is dependent upon the rated capacity of the indoor unit, even refrigerant/oil remained in an indoor unit of large capacity can be recovered reliably.

What is claimed is:

1. A control apparatus for a multi-air-conditioner system having a plurality of indoor units each having an indoor heat exchanger, an outdoor unit having a compressor and an outdoor heat exchanger, and a plurality of control valves provided, respectively, for said plurality of indoor units for controlling the flow of refrigerant circulating through said compressor and said plurality of indoor units, said control apparatus comprising:

first timer means for measuring a first elapsed time corresponding to the period between initiations of a recovery control operation for recovering refrigerant and/or oil which remain in an indoor unit which is not operated to produce heat exchange while another indoor unit is operated;

second timer means for measuring a second elapsed time corresponding to a duration of said recovery control operation;

valve degree of opening calculation means for calculating the degree of opening of a control valve for an indoor unit which is to be operated during said recovery control operation, in accordance with the rated capacity of said indoor unit; and means for causing said control valve of said indoor unit which is not operated to produce heat exchange while another indoor unit is operated to open to the degree of opening calculated by said valve opening calculation means in response to the first elapsed time being measured by said first timer means, and causing said control valve to close in response to the second elapsed time being measured by said second timer means.

2. A control apparatus according to claim 1, wherein said first elapsed time is longer for a heating operation than for a cooling operation.

3. A control apparatus according to claim 1, wherein said second elapsed time is longer for a heating operation than for a cooling operation.

4. A control apparatus according to claim 1, further comprising means for causing the operation frequency of said compressor to become high upon said first elapsed time being measured by said first timer means and to return to its original frequency upon said second elapsed time being measured by said second timer means.

5. A method of controlling a multi-air-conditioner system having a plurality of indoor units each having an indoor heat exchanger, an outdoor unit having a compressor and an outdoor heat exchanger, and a plurality of control valves provided, respectively, for said plurality of indoor units for controlling the flow of refrigerant circulating through said compressor and said plurality of indoor units, wherein said control valve associated with one of said indoor units which is not operated to produce heat exchange when another indoor unit is operated to produce heat exchange is opened to a degree of opening corresponding to the rated capacity of the indoor unit not being operated for heat exchange and maintained open for a predetermined time to effect recovery control operation at a predetermined time interval, in order to recover refrigerant and/or oil remaining in said indoor unit which is not being operated for heat exchange.

* * * * *